United States Patent
Dobrusskin et al.

(10) Patent No.: US 7,883,416 B2
(45) Date of Patent: Feb. 8, 2011

(54) MULTIMEDIA METHOD AND SYSTEM FOR INTERACTION BETWEEN A SCREEN-BASED HOST AND VARIOUS DISTRIBUTED AND FREE-STYLED INFORMATION CONTAINING ITEMS, AND AN INFORMATION CONTAINING ITEM FOR USE WITH SUCH SYSTEM

(75) Inventors: Christoph Dobrusskin, Eindhoven (NL); Jacoba J. Van Dorssen, Eindhoven (NL); Paul D. McGroary, Eindhoven (NL); Roger P. Swales, Eindhoven (NL); Jan P. C. Van Der Voet, Haren (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 978 days.

(21) Appl. No.: 10/014,191

(22) Filed: Nov. 13, 2001

(65) Prior Publication Data

US 2002/0042301 A1     Apr. 11, 2002

Related U.S. Application Data

(63) Continuation of application No. 09/031,695, filed on Feb. 27, 1998, now Pat. No. 6,354,947.

(30) Foreign Application Priority Data

Mar. 12, 1997  (EP)  .................................. 97200738

(51) Int. Cl.
   *A63F 9/24*   (2006.01)
   *A63F 13/00*  (2006.01)
(52) U.S. Cl. .............................. 463/37; 463/24; 463/29; 463/39; 463/43

(58) Field of Classification Search ...................... 463/1, 463/30, 39–44, 35–36, 29, 24, 47; 273/434, 273/238, 236–237; 348/12; 345/326, 328, 345/156, 158; 434/307 R; 364/412, 410; 446/484

See application file for complete search history.

(56) References Cited

U.S. PATENT DOCUMENTS 4,467,424 A     8/1984   Hedges et al.  ............... 364/412

(Continued)

FOREIGN PATENT DOCUMENTS

GB        2103943 A    *   3/1983

(Continued)

OTHER PUBLICATIONS

Film reel clip art #1, sourced from http://www.free-graphics.com/clipart/Entertainment/film_reel.shtml.*

(Continued)

*Primary Examiner*—John M Hotaling, II
*Assistant Examiner*—Steven J. Hylinski

(57) ABSTRACT

A screen-based host with processing and I/O facilities interacts with distributed items that are arranged for storing and exchanging digital information with the host. In particular, under proximity conditions and initially without user interaction, the items exchange accordingly with the host, but without requiring formatted berth facilities of the host. The various items through associated self-identifying evoke specific iconizing by the host for signaling to the user an associated service field. The host allows a user person to activate data processing operations with respect to the service field. During proximity conditions, the items keep abreast of host-generated results relevant to a corresponding service field. The host allows free styling of the items with respect to the item's physical shape.

20 Claims, 2 Drawing Sheets

U.S. PATENT DOCUMENTS

| | | | | |
|---|---|---|---|---|
| 4,712,184 A * | 12/1987 | Haugerud | ............. | 701/1 |
| 4,729,563 A * | 3/1988 | Yokoi | ............. | 463/31 |
| 4,786,967 A * | 11/1988 | Smith et al. | ............. | 348/485 |
| 4,799,171 A * | 1/1989 | Cummings | ............. | 704/272 |
| 4,840,602 A * | 6/1989 | Rose | ............. | 446/175 |
| 4,846,693 A * | 7/1989 | Baer | ............. | 434/308 |
| 5,021,878 A * | 6/1991 | Lang | ............. | 348/61 |
| 5,048,831 A * | 9/1991 | Sides | ............. | 358/1.17 |
| 5,136,285 A * | 8/1992 | Okuyama | ............. | 340/870.11 |
| 5,142,803 A * | 9/1992 | Lang | ............. | 40/411 |
| 5,188,368 A * | 2/1993 | Ryan | ............. | 273/237 |
| 5,191,615 A * | 3/1993 | Aldava et al. | ............. | 381/2 |
| 5,195,920 A * | 3/1993 | Collier | ............. | 446/409 |
| 5,247,668 A * | 9/1993 | Smith et al. | ............. | 717/154 |
| 5,270,480 A * | 12/1993 | Hikawa | ............. | 84/645 |
| 5,289,273 A * | 2/1994 | Lang | ............. | 348/121 |
| 5,317,686 A * | 5/1994 | Salas et al. | ............. | 715/212 |
| 5,377,997 A | 1/1995 | Wilden et al. | ............. | 273/434 |
| 5,428,528 A * | 6/1995 | Takenouchi et al. | ............. | 463/42 |
| 5,596,704 A * | 1/1997 | Geddes et al. | ............. | 715/764 |
| 5,636,920 A | 6/1997 | Shur et al. | ............. | 364/410 |
| 5,636,994 A * | 6/1997 | Tong | ............. | 434/308 |
| 5,651,548 A * | 7/1997 | French et al. | ............. | 463/25 |
| 5,675,637 A * | 10/1997 | Szlam et al. | ............. | 379/142.17 |
| 5,707,289 A | 1/1998 | Watanabe et al. | ............. | 463/40 |
| 5,715,416 A * | 2/1998 | Baker | ............. | 715/839 |
| 5,735,744 A | 4/1998 | Okamoto | ............. | 463/40 |
| 5,738,583 A * | 4/1998 | Comas et al. | ............. | 463/40 |
| 5,752,880 A * | 5/1998 | Gabai et al. | ............. | 463/1 |
| 5,766,077 A * | 6/1998 | Hongo | ............. | 463/30 |
| 5,770,533 A * | 6/1998 | Franchi | ............. | 463/42 |
| 5,782,692 A | 7/1998 | Stelovsky | ............. | 463/1 |
| 5,788,507 A | 8/1998 | Redford et al. | ............. | 434/307 R |
| 5,802,361 A * | 9/1998 | Wang et al. | ............. | 382/217 |
| 5,818,441 A | 10/1998 | Throckmorton et al. | ............. | 345/328 |
| 5,830,065 A | 11/1998 | Sitrick | ............. | 463/31 |
| 5,851,149 A | 12/1998 | Xidos et al. | ............. | 463/43 |
| 5,903,647 A | 5/1999 | Ronning | ............. | 380/4 |
| 5,911,582 A * | 6/1999 | Redford et al. | ............. | 434/307 R |
| 5,937,081 A * | 8/1999 | O'Brill et al. | ............. | 382/111 |
| 5,971,855 A * | 10/1999 | Ng | ............. | 463/42 |
| 5,977,951 A * | 11/1999 | Danieli et al. | ............. | 345/156 |
| 6,001,016 A * | 12/1999 | Walker et al. | ............. | 463/42 |
| 6,012,961 A * | 1/2000 | Sharpe et al. | ............. | 446/298 |
| 6,022,273 A * | 2/2000 | Gabai et al. | ............. | 463/39 |
| 6,022,274 A * | 2/2000 | Takeda et al. | ............. | 463/44 |
| 6,052,120 A | 4/2000 | Nahi et al. | ............. | 345/326 |
| 6,064,420 A | 5/2000 | Harrison et al. | ............. | 348/12 |
| 6,075,195 A * | 6/2000 | Gabai et al. | ............. | 84/645 |
| 6,110,041 A * | 8/2000 | Walker et al. | ............. | 463/20 |
| 6,160,540 A * | 12/2000 | Fishkin et al. | ............. | 345/184 |
| 6,165,038 A * | 12/2000 | Muller | ............. | 446/219 |
| 6,165,068 A * | 12/2000 | Sonoda et al. | ............. | 463/8 |
| 6,213,871 B1 * | 4/2001 | Yokoi | ............. | 463/7 |
| 6,238,291 B1 * | 5/2001 | Fujimoto et al. | ............. | 463/44 |
| 6,244,958 B1 * | 6/2001 | Acres | ............. | 463/26 |
| 6,288,716 B1 * | 9/2001 | Humpleman et al. | ............. | 715/733 |
| 6,331,972 B1 * | 12/2001 | Harris et al. | ............. | 370/313 |
| 6,354,947 B1 * | 3/2002 | Dobrusskin et al. | ............. | 463/43 |
| 6,652,383 B1 * | 11/2003 | Sonoda et al. | ............. | 463/43 |
| 6,814,662 B2 * | 11/2004 | Sasaki et al. | ............. | 463/1 |
| 7,081,033 B1 * | 7/2006 | Mawle et al. | ............. | 446/175 |

FOREIGN PATENT DOCUMENTS

| | | | |
|---|---|---|---|
| GB | 2237514 A * | 5/1991 | |
| WO | 9603188 A1 | 2/1996 | |

OTHER PUBLICATIONS

Film reel clip art #2, sourced from http://www.clker.com/clipart-video-film-reel.html.*

* cited by examiner

MULTIMEDIA METHOD AND SYSTEM FOR INTERACTION BETWEEN A SCREEN-BASED HOST AND VARIOUS DISTRIBUTED AND FREE-STYLED INFORMATION CONTAINING ITEMS, AND AN INFORMATION CONTAINING ITEM FOR USE WITH SUCH SYSTEM

CROSS REFERENCE TO RELATED APPLICATIONS

This is a continuation of application Ser. No. 09/031,695, filed Feb. 27, 1998 now U.S. Pat. No. 6,354,947.

BACKGROUND OF THE INVENTION

The invention relates to a multimedia method for use with a screen-based host system provided with information processing and I/O facilities, and interacting with one or more distributed items that are arranged for storing information and exchanging information with the host system. Various computer systems have been proposed to interact with external memory carriers for exchanging data therewith, such as programs. On the other hand, multimedia systems that to a certain extent are designed to operate under non-data-processing conditions and with various different types of operator persons, that in particular may not be computer literate, should have a user interface that is very different in style and functionality. The inventors have recognized that functionality and styling of such data carriers should attract such other social environment.

SUMMARY TO THE INVENTION

In consequence, amongst other things, it is an object of the present invention to provide the system versus such data items with an immediate reactivity and physical recognizability as to their content. Now therefore, according to one of its aspects, the invention is characterized in that said multimedia method comprises the steps of allowing the distributed items to exchange analog or digital information under proximity conditions with respect to the host, but without requiring formatted berth facilities of the host, with respect to various such items evoking through self-identifying thereof associated specific iconizing by the host for signaling to a user an associated and selective information processing and/or entertainment oriented service field, furthermore so allowing by the host a user person to activate information processing operations with respect to the selective service field, having each item so keeping abreast of host-generated results during such proximity conditions as being relevant to its associated field, whilst allowing free styling of such item with respect to physical shape requirements thereto.

The evoking of a specific icon on the host screen is token for an allowable interactivity, and the storing of appropriate processing results in the item allows a user to discontinue a session, whilst still being able to later resume at an interaction point that is deemed relevant. The free-styling of the items makes recognizing easier for little children and other categories of people.

By itself, PCT published Patent application WO 96 03188 A1 discloses a system wherein particular toy figures in proximity conditions with the system may identify themselves versus the system for so activating an associated audio visual display sequence on the system display. However, the toys will only identify themselves towards the system, whereas the present invention additionally allows to store various data processing quantities in the information item, as well as to lend to the items a characteristic shape.

The invention also relates to a system arranged for implementing the method, and to an item for use with the method. Further advantageous aspects of the invention are recited in dependent Claims.

BRIEF DESCRIPTION OF THE DRAWING

These and further aspects and advantages of the invention will be discussed more in detail with reference to the disclosure of preferred embodiments hereinafter, and in particular with reference to the appended Figures that show.

DETAILED DESCRIPTION OF PREFERRED EMBODIMENTS

Figure 1:
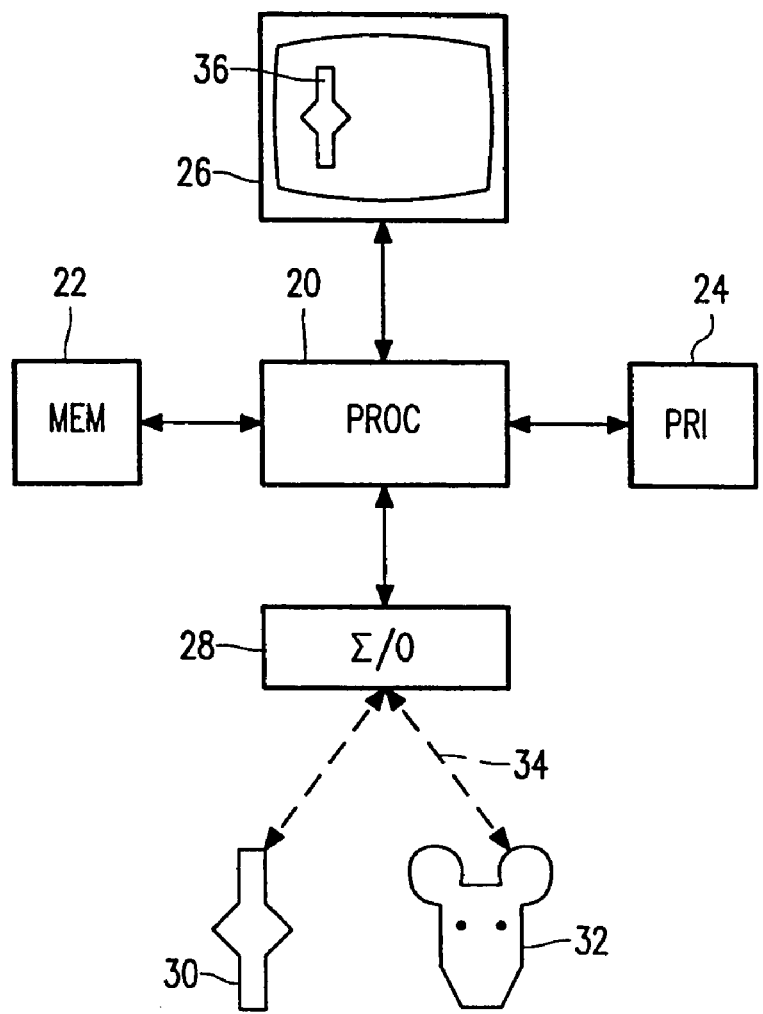
FIG. 1, a block diagram of a system of the invention.

FIG. 1 is a block diagram of an exemplary system according to the invention. The screen-based host has central processing facility 20, memory facility 22, printer facility 24, display screen facility 26, and I/O facility 28. A system with fewer than all of the above facilities could be feasible as well. All of these facilities are interconnected as shown by arrows. Two of the distributed and free-styled information items 30, 32 have been shown, one of them having a geometrical shape, and the other being shaped as a recognizable toy figurine. The screen is preferably a touch or stylus actuated screen. The I/O facilities may comprise keyboard, joystick, mouse, speech-based interaction and further facilities which have not been shown specifically; none of these are really indispensable, provided that at least one mechanism for receiving user interaction is available. In particular however, arrows 34 symbolize wireless intercommunication between I/O subsystem 28 and the distributed items 30, 32. As shown on the display screen 26, interaction between item 30 and I/O makes an icon 36 appear that may correspond to the physical shape of the item in question, or otherwise symbolize the associated service field.

Figure 2:
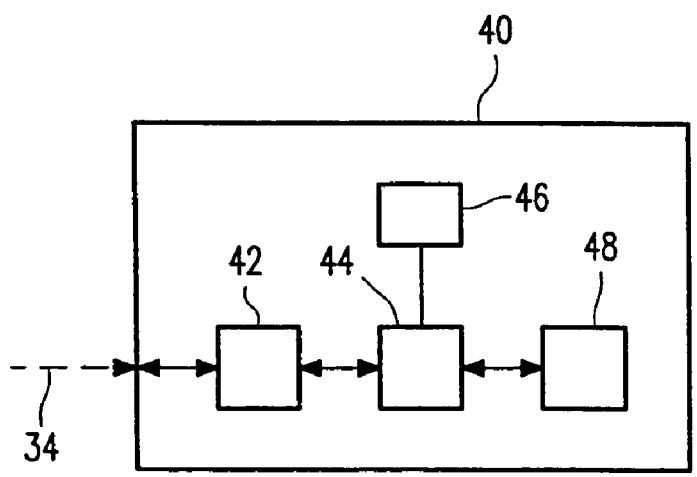
FIG. 2, a block diagram of an item of the invention.

FIG. 2 is a block diagram of an information item 40 according to the invention. As shown, the item itself has not been detailed as to the styling thereof. Various parts of the item are communication part 40 for interfacing to wireless connection 34, processing part 44, permanent memory part 48 and variable memory part 46. All of these facilities are internally interconnected as shown by arrows. Furthermore, battery powering is on board but has not been shown for brevity; solar cell powering is feasible as well. Useable examples for the styling are: semi-personal toy figures like Barbie-dolls or (semi)-animals, geometrical shapes like diabolo's or toroids, fantasy shapes or minimal art with contorted or abstracted forms, or rather common household articles such as a decorative vase, a presse-papier, or other. The electronic part thereof would be barely more than a single solid state chip with a few elements for the communication, such as a loop antenna or the like. The two-dimensional icon representation on the screen of the generally three-dimensional item may symbolize the shape of the item. Alternatively, the icon may represent the associated service field. Further, after entering the screen, the icon may be a so-called dynamic icon that suggests some level of life or action therein. Such dynamism may include geometrical transform in 2-D or 3-D, animation, colour change, and others. Also, the entire screen may be filled with graphics that represent the item and/or the service filed, such as used in screen savers.

Figure 3:
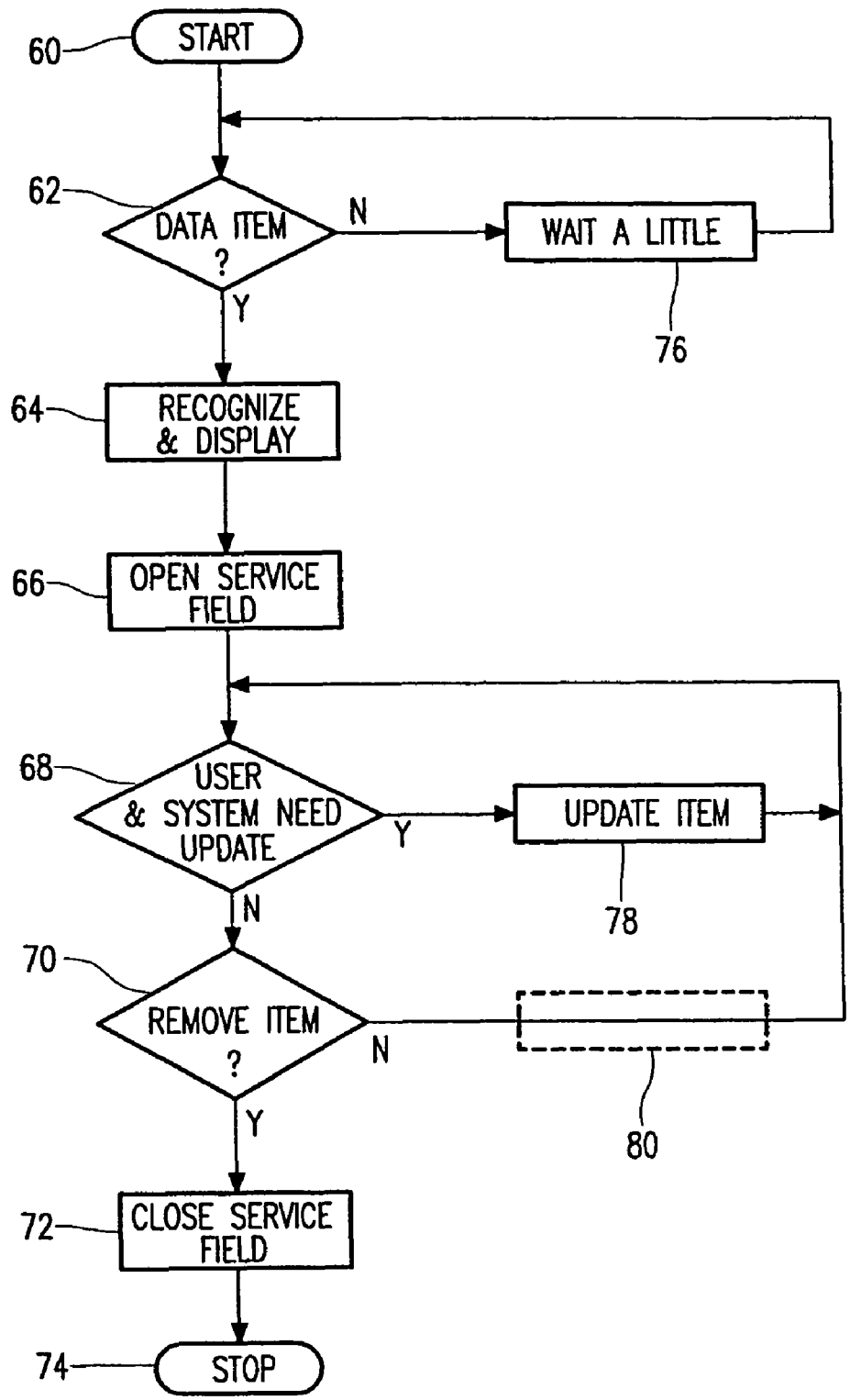
FIG. 3, a flow chart of the interaction.

FIG. 3 is an exemplary flow chart of the interaction between the host system and a single distributed item. In block 60, the host system is activated, such as by a power switch. In block 62, the host detects whether a distributed item is within an appropriate proximity; this may be a distance of about one meter, or a presence in the same room. If no, block 76 implements a waiting loop. If yes, in block 64, the identity of the item is recognized. This may be effected through an elementary dialogue between host and item, or even with the item as an object that is electronically passive, e.g. in that it may detune an RF field or through other means. The identity may be a discrete quantity, such as a frequency value in a particular range, or a full digital information, such as an eight-bit code stored in a permanent memory part of the item. Upon recognition, the associated icon is displayed, either in a standard manner, or updated from some information retrieved from the variable memory part of the item. There may be feedback on the item, such as in the form of a LED or beep, even if the proximity condition is not fulfilled.

Next, the service field is opened. This field may pertain to a particular information-related area pertaining to the item, such as a video game in which the item figures as a character, an audio story that is read from the host memory and may imply choices to be made by a listener, a video diary that may be kept and updated by the user person, and various others. Various different service fields may in alternation be produced by any host. The user may now interact immediately with the host, for changing content and/or visualisation of the service field. In block 68 the system detects whether user item or system would need an update. If yes, in block 78, the content of the variable memory of the item is updated. In block 70, it is detected whether the item is being removed or has been removed from the proximity condition in question. If no, in block 80 a waiting interval may be implemented or not. If the item has been removed, in block 72 the service field is closed, the content of the permanent memory of the item is being frozen for later use, and the iconized display of the actual item is suppressed. In block 74, the system, and in particular the host, is stopped.

The information stored into the item to keep it abreast with the associated service field may be various. In a game of skills, the information may indicate the level of skill actually attained by the user person. In case of a toy, the user may decide to give the item a name, and the name is stored, so that the host may call by voice the item upon its presentation. This also applies if the service field would also run on another host. The information may be a brief song, so that the host will sing this song when the item is again presented. Various other types of information might be relished by a user person.

The invention claimed is:

1. A multimedia method for use with a screen-based host provided with information processing and I/O facilities, and for interacting with an item, the method comprising:
   receiving identity information from the item at the host, in response to proximity conditions between the host and the item;
   presenting to a user an icon that is representative of the item and an associated service field at the host in response to the identity information, the representative icon having a location that is movable within the associated service field based on interactions by the user to indicate the user interactions with the associated service field;
   generating information of a last user interaction related to the user interactions with the associated service field; and
   transmitting information based on the user interactions, from the host to the item, including the information of the last user interaction, for storage at the item to enable resuming a discontinued session at a later time, in response to proximity conditions between the host and the item at the later time.

2. The method of claim 1, comprising enabling the user to activate information processing operations at the host related to the associated service field and the stored information of the last user interaction.

3. The method of claim 1, comprising transmitting host-generated results related to the associated service field during such proximity conditions to the item.

4. The method of claim 1, including identifying the host to the item in response to proximity conditions between the host and the item.

5. The method of claim 1, wherein one or more characteristics of the representative icon is user definable.

6. A multimedia method for use with a screen-based host system provided with information processing and I/O facilities, and for interacting with an item, the method comprising:
   receiving identity information from the item at the host system including stored information of a last user interaction related to the identity information, in response to proximity conditions between the host system and the item;
   selecting an icon that is representative of the item and an application program based on the identity information, the application program including one of an information processing program and an entertainment program;
   executing the application program at the host system;
   varying location of the representative icon within an associated service field of the application program based on interactions by a user, the representative icon having a location that is movable within the associated service field based on the interactions by the user to indicate the user interactions with the application program and the stored information of the last user interaction with the application program; and
   transmitting information from the application program to the item based on the user interactions including an update to the stored information of the last user interaction based on the proximity conditions between the host system and the item, for storage at the item to enable resuming a discontinued session at a later time, in response to proximity conditions between the host and the item at the later time.

7. The method of claim 6, wherein the application program is configured to produce the representative icon in response to the identity information.

8. The method of claim 7, wherein the application program includes at least one of: a video game; an audio story; and a diary and wherein the stored information of the last user interaction enables a user to resume a discontinued interaction with the application program.

9. The method of claim 6, wherein the application program includes at least one of: a video game; an audio story; and a diary and wherein the stored information of the last user interaction enables a user to resume a discontinued interaction with the application program.

10. The method of claim 6, wherein the information that is transmitted to the item includes information particular to a user of the item.

11. The method of claim 6, wherein the information that is transmitted to the item includes processing results of the last user interaction that allows a user to discontinue a session, while still being able to later resume the session.

12. The method of claim 6, wherein the identity information is substantially unique to the item, and the representative icon is correspondingly substantially unique to the item.

13. The method of claim 6, wherein one or more characteristics of the representative icon is user definable.

14. The method of claim 6, wherein the representative icon corresponds to a two-dimensional icon representation of the three-dimensional item.

15. A computer program stored on a non-transitory computer-readable medium that, when executed by a screen-based host system, causes the host system to:
  receive identity information including stored information of a last user interaction related to the identity information from an item in response to proximity conditions between the host system and the item;
  present an icon representative of the item and an associated service field of an application program based on the identity information;
  vary location of the representative icon within the associated service field based on interactions by a user with the application program, the representative icon having a location that is movable within the associated service field based on interactions by the user to indicate the user interactions with the associated service field; and
  transmit information for storage at the item based on the user interactions with the application program for updating the stored information of the last user interaction to enable resuming a discontinued session at a later time, in response to proximity conditions between the host and the item at the later time.

16. The computer program of claim 15, wherein the information that is transmitted includes processing results of the last user interaction that allows a user to discontinue a session, while still being able to later resume the session.

17. The computer program of claim 15, wherein one or more of the characteristics of the representative icon are user-definable.

18. The computer program of claim 15, wherein the representative icon corresponds to a two-dimensional icon representation of the three-dimensional item.

19. The computer program of claim 15, wherein the representative icon is an animated icon.

20. The computer program of claim 15, wherein the application program is configured to provide the representative icon based on the identity information.

\* \* \* \* \*